(12) United States Patent
Lindemann

(10) Patent No.: US 9,285,030 B2
(45) Date of Patent: Mar. 15, 2016

(54) METHOD OF CONTROLLING CLUTCHES IN A MULTI-FUNCTION TORQUE CONVERTER

(71) Applicant: Schaeffler Technologies GmbH & Co. KG, Herzogenaurach (DE)

(72) Inventor: Patrick M. Lindemann, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/334,220

(22) Filed: Jul. 17, 2014

(65) Prior Publication Data

US 2015/0068856 A1    Mar. 12, 2015

Related U.S. Application Data

(60) Provisional application No. 61/876,383, filed on Sep. 11, 2013.

(51) Int. Cl.
| | |
|---|---|
| *F16H 61/14* | (2006.01) |
| *F16H 45/02* | (2006.01) |
| *F16H 61/58* | (2006.01) |
| *F16H 45/00* | (2006.01) |

(52) U.S. Cl.
CPC .............. *F16H 61/14* (2013.01); *F16H 45/02* (2013.01); *F16H 61/58* (2013.01); *F16H 2045/002* (2013.01); *F16H 2045/007* (2013.01); *F16H 2045/021* (2013.01); *F16H 2045/0215* (2013.01)

(58) Field of Classification Search
None
See application file for complete search history.

(56) References Cited

U.S. PATENT DOCUMENTS

| 8,167,103 | B2 | 5/2012 | Uhler et al. | |
|---|---|---|---|---|
| 8,225,915 | B2* | 7/2012 | Ames | F16H 61/0206 192/3.25 |
| 2008/0149441 | A1* | 6/2008 | Sturgin | F16H 45/02 192/3.25 |
| 2008/0149442 | A1* | 6/2008 | Sturgin | F16H 45/02 192/3.26 |
| 2008/0202882 | A1* | 8/2008 | Sturgin | F16D 25/0638 192/3.25 |
| 2015/0053521 | A1* | 2/2015 | Frary | F16D 33/18 192/3.25 |

* cited by examiner

*Primary Examiner* — Rodney H Bonck
(74) *Attorney, Agent, or Firm* — Simpson & Simpson, PLLC

(57) ABSTRACT

A method of controlling a multi-function torque converter including a cover, an impeller shell, a turbine shell, a first pressure chamber at least partially formed by the turbine shell and the cover; a second pressure chamber at least partially formed by the impeller and turbine shells, and a third pressure chamber at least partially formed by the impeller shell and the cover, an impeller clutch including a portion of the impeller shell, and a turbine clutch including a portion of the turbine shell, the method including: pressurizing the first pressure chamber to substantially a first fluid pressure level or to a second fluid pressure level greater than the first level; pressurizing the second pressure chamber to a third fluid pressure level greater than the first and second levels; passively draining the third pressure chamber to be substantially at the first level; and connecting the impeller shell to the cover.

20 Claims, 2 Drawing Sheets

METHOD OF CONTROLLING CLUTCHES IN A MULTI-FUNCTION TORQUE CONVERTER

CROSS-REFERENCE TO RELATED APPLICATIONS

This application claims the benefit under 35 U.S.C. §119 (e) of U.S. Provisional Patent Application No. 61/876,383, filed Sep. 11, 2013, which application is incorporated herein by reference in its entirety.

TECHNICAL FIELD

The present disclosure relates to a method of controlling a multi-function torque converter with two active fluid circuits.

BACKGROUND

It is know to use three controllable fluid circuits (three-pass) to provide pressurized fluid to and to drain fluid from the torus and two pressure chambers to control operation of a multi-function torque converter with impeller and torque converter clutches. A pump in a transmission is typically used to provide pressurized fluid for the torque converter and to drain fluid from the torque converter. However, most known transmissions can only provide two controllable fluid circuits making the three-pass design unusable with these transmissions.

For a multi-function torque converter with only two controllable fluid circuits (two-pass), it is known to close the impeller clutch and then to close the torque converter clutch in series. For example, to use the same fluid circuit to provide apply pressure to close both the impeller clutch and the torque converter clutch. However, this process reduces the pressure bandwidth for both clutches. Further, the torque converter clutch-apply pressure for known multi-function torque converters typically starts at a higher level than in a conventional torque converter. As a result, there is need for higher pressure in the circuit and increased pump capacity, and efficiency of the hydraulic system decreases. In addition, with typical multi-function torque converter designs having a two-pass design, it is difficult to control the closing of the impeller clutch; for example, the impeller clutch typically closes too abruptly causing an uncomfortable sensation for the driver of the vehicle including the torque converter.

SUMMARY

According to aspects illustrated herein, there is provided a method of controlling a multi-function torque converter including a cover arranged to receive torque, an impeller including an impeller shell and at least one impeller blade connected to the impeller shell, a turbine including a turbine shell and at least one turbine blade connected to the turbine shell, a first pressure chamber at least partially formed by the turbine shell and the cover; a second pressure chamber at least partially formed by the impeller and turbine shells, and a third pressure chamber at least partially formed by the impeller shell and the cover, an impeller clutch including a portion of the impeller shell, and a turbine clutch including a portion of the turbine shell, the method including: pressurizing the first, second, and third pressure chambers, respectively, to substantially a first fluid pressure level; disconnecting the impeller and turbine clutches from the cover; pressurizing the first pressure chamber to substantially the first fluid pressure level or to a second fluid pressure level greater than the first fluid pressure level; pressurizing the second pressure chamber to a third fluid pressure level greater than the first or second fluid pressure levels; passively draining the third pressure chamber to be substantially at the first fluid pressure level; connecting the impeller shell to the cover for a torque converter mode; pressurizing the first pressure chamber to a fourth fluid pressure level greater than the first fluid pressure level; pressurizing the second pressure chamber to a fifth fluid pressure level greater than the first fluid pressure level and less than the fourth fluid pressure level; pressurizing the third pressure chamber to substantially the first fluid pressure level; connecting the impeller shell to the cover; and connecting the turbine shell to the impeller shell for a lockup mode.

According to aspects illustrated herein, there is provided a method of controlling a multi-function torque converter including a cover arranged to receive torque, an impeller including an impeller shell and at least one impeller blade connected to the impeller shell, a turbine including a turbine shell and at least one turbine blade connected to the turbine shell, a first pressure chamber at least partially formed by the turbine shell and the cover; a second pressure chamber at least partially formed by the impeller and turbine shells, and a third pressure chamber at least partially formed by the impeller shell and the cover, an impeller clutch including a portion of the impeller shell, and a turbine clutch including a portion of the turbine shell, the method including: pressurizing the first pressure chamber to substantially a first fluid pressure level or to a second fluid pressure level greater than the first fluid pressure level; pressurizing the second pressure chamber to a third fluid pressure level greater than the first and second fluid pressure levels; passively draining the third pressure chamber to be substantially at the first fluid pressure level; and connecting the impeller shell to the cover for a torque converter mode.

According to aspects illustrated herein, there is provided a method of controlling a multi-function torque converter including a cover arranged to receive torque, an impeller including an impeller shell and at least one impeller blade connected to the impeller shell, a turbine including a turbine shell and at least one turbine blade connected to the turbine shell, a first pressure chamber at least partially formed by the turbine shell and the cover; a second pressure chamber at least partially formed by the impeller and turbine shells, and a third pressure chamber at least partially formed by the impeller shell and the cover, an impeller clutch including a portion of the impeller shell and first friction material, and a turbine clutch including a portion of the turbine shell and second friction material, the method including: maintaining a substantially constant first fluid pressure force, in a first axial direction, on the impeller shell; applying a second fluid pressure force on respective first sides of the turbine and impeller shells in the first axial direction and in a second axial direction opposite the first axial direction, respectively; applying a third fluid pressure force to a second side of the turbine; displacing the impeller shell in the second axial direction; bringing the first friction material into contact with the cover and the portion of the impeller shell; and independently rotating the turbine shell with respect to the impeller shell.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
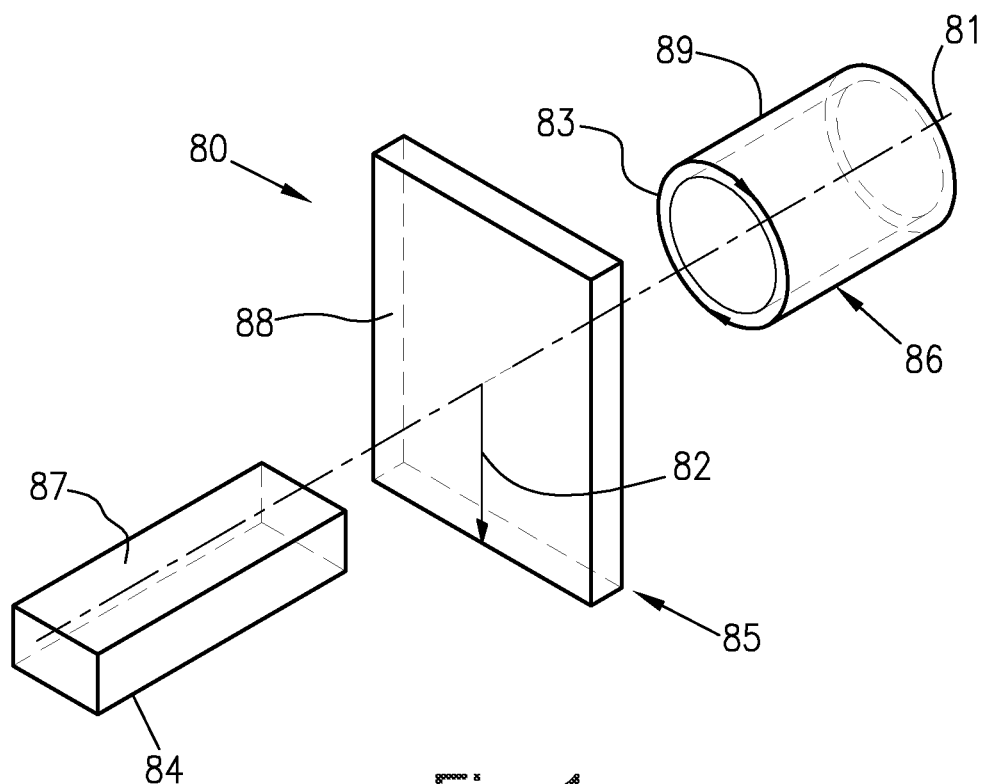
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
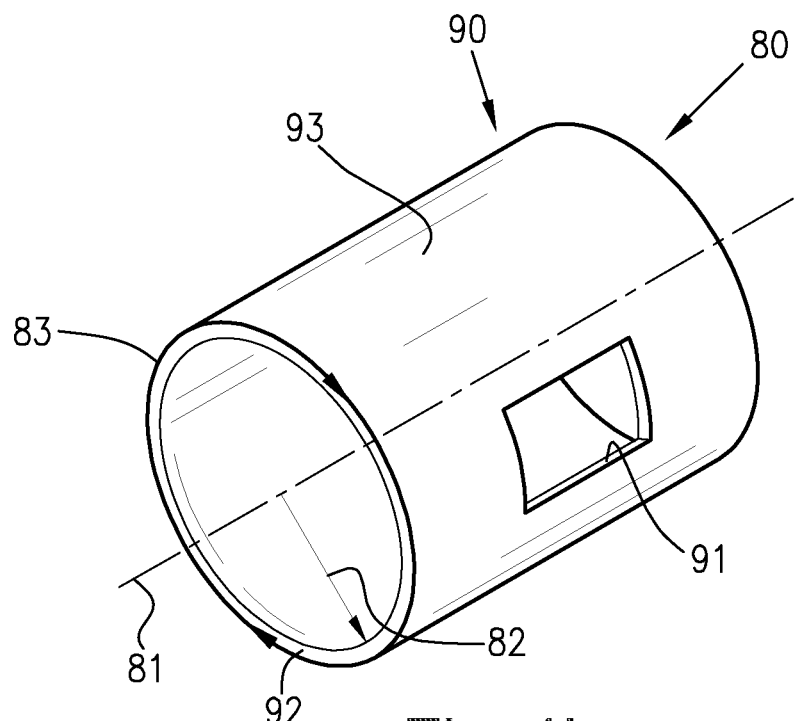
FIG. 1B is a perspective view of an object in the cylindrical coordinate system of FIG. 1A demonstrating spatial terminology used in the present application; and, FIG. 2 is partial cross-sectional view of a multi-function torque converter.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
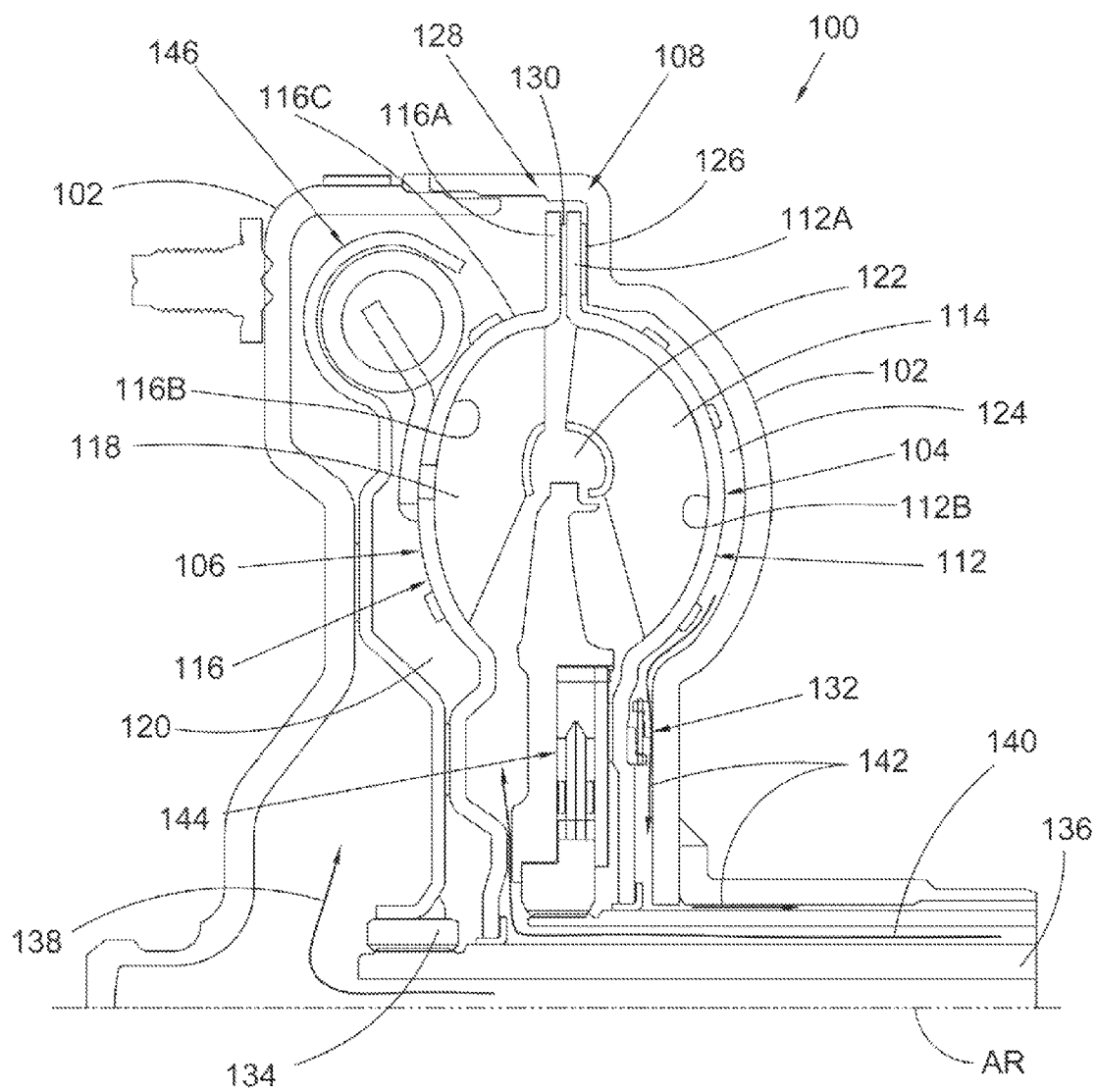

FIG. 2 is partial cross-sectional view of multi-function torque converter 100. Multi-function torque converter 100 includes axis of rotation AR, cover 102, impeller 104, turbine 106, and impeller clutch 108. Cover 102 is arranged to receive torque. Impeller 104 includes impeller shell 112 and at least one impeller blade 114 connected to the impeller shell. Turbine 106 includes turbine shell 116 and at least one turbine blade 118 connected to the turbine shell. Converter 100 includes pressure chamber 120 is at least partially formed by the turbine shell and the cover, pressure chamber 122 at least partially formed by the impeller and turbine shells, and pressure chamber 124 at least partially formed by the impeller shell and the cover. Impeller clutch 108 includes portion 112A of the impeller shell and friction material 126. Turbine clutch 128 includes portion 112A of the impeller shell, portion 116A of the turbine shell, and friction material 130. Converter 100 includes: resilient element 132 arranged to urge the impeller shell in axial direction AD1; and output hub 134 arranged to non-rotatably connect to input shaft 136 for a transmission.

The following describes a method of controlling a multi-function torque converter, such as torque converter 100. In general, converter 100 operates in three modes: an idle disconnect mode in which the impeller and turbine clutches are open and torque on cover 102 is isolated from output hub 134; torque converter mode in which torque from cover 102 is transmitted through impeller clutch 108 to impeller shell 112 and turbine clutch 128 is open; and lock-up mode in which both the impeller and torque converter clutches are closed.

For the idle disconnect mode, pressure chambers 120, 122, and 124 are each pressurized to substantially a same fluid pressure level. The substantially equalized pressurization combined with the operation of the resilient element results in impeller shell 112 being displaced in direction AD1 to open impeller clutch 108. The substantially equalized pressurization results in turbine shell 116 being independently rotatable with respect to impeller shell 112, that is, there is no force closing turbine clutch 128.

For the torque converter mode: a first step pressurizes pressure chamber 120 to substantially a first fluid pressure level or to a second fluid pressure level greater than the first fluid pressure level; a second step pressurizes pressure chamber 122 to a third fluid pressure level greater than the first or second fluid pressure levels; a third step passively drains pressure chamber 124 to be substantially at the first fluid pressure level; and a fourth step connects impeller shell 112 to cover 102. Thus, the preceding steps result in fluid pressure in chamber 122 overcoming force originating from chamber 124 to displace the impeller shell in direction AD2, opposite AD1, to close the impeller clutch. At the same time, fluid pressure in chamber 122 is greater than fluid pressure in chamber 120, resulting in the displacement of the turbine shell in direction AD1 to open the turbine clutch. By "passively drain" we mean that chamber 124 is not connected to an active fluid circuit, that is, fluid pressure in chamber 124 (and the flow of fluid in and out of chamber 124) is not actively controlled. For example, in a two-pass fluid circuit system, chamber 124 is not connected to one of the two passes and is passively vented.

For the lock-up mode: a first step pressurizes pressure chamber 120 to a fourth fluid pressure level greater than the first fluid pressure level; a second step pressurizes pressure chamber 122 to a fifth fluid pressure level greater than the first fluid pressure level and less than the fourth fluid pressure level; a third step passively drains pressure chamber 124 to be substantially at the first fluid pressure level; and a fourth step connects the turbine clutch to the cover. Thus, the preceding steps result in fluid pressure in chamber 122 overcoming force originating from chamber 124 to displace the impeller shell in direction AD2 to close the impeller clutch. At the same time, fluid pressure in chamber 120 is greater than fluid pressure in chamber 122, resulting in the displacement of the turbine shell in direction AD2 to close the turbine clutch.

Fluid from chambers 120 or 122 can flow into chamber 124 (between portion 112A and cover 102) during pressurizing steps, for example, as chamber 120 is pressurized to close impeller clutch 108. However, the passive draining of chamber 124 relieves any pressure build up due to the flow, maintaining the substantially equal fluid pressure in chamber 124 during idle disconnect, torque converter, and lock-up modes.

In an example embodiment: pressurizing chamber 120 includes flowing fluid to and from chamber 120 through fluid circuit 138; pressurizing chamber 122 includes flowing fluid to and from chamber 122 through fluid circuit 140; and passively draining pressure chamber 124 to be substantially at the first fluid pressure level includes venting chamber 124 through fluid circuit 142, that is, circuit 142 is not active.

In an example embodiment pressurizing pressure chamber 120 to substantially the first fluid pressure level or to a second fluid pressure level greater than the first fluid pressure level includes pressurizing pressure chamber 120 to substantially the first fluid pressure level and not to the second fluid pressure level and connecting impeller shell 112 to the cover for the torque converter mode includes enabling a first torque-carrying capacity for impeller clutch 108. In an example embodiment: pressurizing pressure chamber 120 to substantially the first fluid pressure level or to a second fluid pressure level greater than the first fluid pressure level includes pressurizing the first pressure chamber to the second fluid pressure level; and connecting impeller shell 112 to the cover includes enabling a second torque-carrying capacity, greater than the first torque-carrying capacity, for impeller clutch 108. Thus, the present method advantageously enables variable control of apply pressure for impeller clutch 108 and as a result, variable control of torque-carrying capacity for impeller clutch 108 within the framework of a two-pass system. That is, the fluid pressure in chamber 120 can be controlled to provide the minimum amount of force needed to meet the torque-carrying capacity of impeller clutch 108 without providing excess, non-necessary fluid pressure. Advantageously, this minimizes the energy associated with operating torque converter 100.

In an example embodiment: pressurizing pressure chamber 122 to a fifth fluid pressure level greater than the first fluid pressure level and less than the fourth fluid pressure level includes pressurizing pressure chamber 122 to a sixth fluid pressure level and connecting turbine shell 116 to the cover for the lockup mode includes enabling a first torque-carrying capacity for turbine clutch 128. In an example embodiment pressurizing pressure chamber 122 to a fifth fluid pressure level greater than the first fluid pressure level and less than the fourth fluid pressure level includes pressurizing pressure chamber 122 to a seventh fluid pressure level, greater than the sixth fluid pressure level and connecting turbine shell 116 to the cover for the lockup mode includes enabling a second torque-carrying capacity, greater than the first torque-carrying capacity, for turbine clutch 128. Thus, the present method advantageously enables variable control of apply pressure for impeller turbine clutch 128 and as a result, variable control of torque-carrying capacity for turbine clutch 128 in the framework of a two-pass system. That is, the fluid pressure in chamber 122 can be controlled to provide the minimum amount of force needed to meet the torque-carrying capacity of turbine clutch 128 without providing excess, non-necessary fluid pressure. Advantageously, this minimizes the energy associated with operating torque converter 100.

In an example embodiment, pressurizing pressure chamber 120 to substantially the first fluid pressure level or to a second fluid pressure level greater than the first fluid pressure level includes pressurizing pressure chamber 120 to substantially the first fluid pressure level. In an example embodiment, pressurizing pressure chamber 120 to substantially the first fluid pressure level or to a second fluid pressure level greater than the first fluid pressure level includes pressurizing pressure chamber 120 to the second fluid pressure level.

In an example embodiment pressurizing pressure chamber 120 to substantially the first fluid pressure level or to a second fluid pressure level greater than the first fluid pressure level includes pressurizing pressure chamber 120 to substantially the first fluid pressure level and pressurizing pressure chamber 122 to a third fluid pressure level greater than the first or second fluid pressure levels includes pressurizing pressure chamber 122 to a third fluid pressure level greater than the first fluid pressure level and less than the second fluid pressure level.

In an example embodiment, pressurizing pressure chamber 120 to substantially the first fluid pressure level or to a second fluid pressure level greater than the first fluid pressure level includes pressurizing pressure chamber 120 to substantially the second fluid pressure level and pressurizing pressure chamber 122 to a third fluid pressure level greater than the first or second fluid pressure levels includes pressurizing pressure chamber 122 to a third fluid pressure level greater than the second fluid pressure level.

In an example embodiment: torque converter mode is initiated from idle disconnect mode; pressurizing pressure chamber 120 to substantially the first fluid pressure level or to a second fluid pressure level greater than the first fluid pressure level includes maintaining substantially a same fluid pressure in the first pressure chamber or increasing fluid pressure in the first pressure chamber; pressurizing pressure chamber 122 to the third fluid pressure level greater than the first or second fluid pressure levels includes increasing fluid pressure in pressure chamber 122; and passively draining pressure chamber 124 to be substantially at the first fluid pressure level includes maintaining substantially a same fluid pressure in pressure chamber 124.

In an example embodiment: lock-up mode is initiated from torque converter mode; pressurizing pressure chamber 120 to a fourth fluid pressure level greater than the first fluid pressure level includes increasing fluid pressure in pressure chamber 120; pressurizing pressure chamber 122 to a fifth fluid pressure level greater than the first fluid pressure level and less than the fourth fluid pressure level includes decreasing fluid pressure in pressure chamber 122; and passively draining pressure chamber 124 to be substantially at the first fluid pressure level includes maintaining substantially a same fluid pressure in pressure chamber 124.

In an example embodiment, for torque converter mode: a first step maintains a substantially constant fluid pressure force, in axial direction AD1 on impeller shell 112; a second step applies a fluid pressure force on respective sides 116B and 112B of the turbine and impeller shells in directions AD1 and AD2, respectively; a third step applies a fluid pressure force to side 116C of turbine shell 116; a fourth step displaces impeller shell 112 in direction AD2; a fifth step brings friction material 126 into contact with cover 102 and portion 112A (closing impeller clutch 108); and a sixth step independently rotates turbine shell 116 with respect to impeller shell 112 (turbine clutch 128 is open). For example: fluid pressure in chamber 124 provides the force for the first step; fluid pressure in chamber 122 provides the force in the second step; fluid pressure in chamber 120 provides the force in the third step.

In an example embodiment, for lock-up mode: a first step increases the fluid pressure force on side 116C of turbine shell 116; a second step sets the fluid pressure force on respective sides 116B and 112B less than the increased fluid pressure force on side 116C; a third step displaces turbine shell 116 in the direction AD1; and a fourth step brings friction material 130 into contact with portions 112A and 116A (closing turbine clutch 128).

In an example embodiment, for the idle disconnect mode: a first step equalizes respective fluid forces acting on impeller shell 112 and turbine shell 116; a second step independently rotates impeller shell 112 with respect to cover 102 (impeller clutch 108 is open); and a third step independently rotates turbine shell 116 with respect to impeller shell 112 (turbine clutch 128 is open). For example, respective fluid pressures in chambers 120, 122, and 124 provide the equalized fluid forces.

In an example embodiment, torque converter 100 includes stator 144. In an example embodiment, torque converter 100 includes vibration damper 146.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A method of controlling a multi-function torque converter including a cover arranged to receive torque, an impeller including an impeller shell and at least one impeller blade connected to the impeller shell, a turbine including a turbine shell and at least one turbine blade connected to the turbine shell, a first pressure chamber at least partially formed by the turbine shell and the cover; a second pressure chamber at least partially formed by the impeller and turbine shells, and a third pressure chamber at least partially formed by the impeller shell and the cover, an impeller clutch including a portion of the impeller shell, and a turbine clutch including a portion of the turbine shell, the method comprising:
   pressurizing the first, second, and third pressure chambers, respectively, to substantially a first fluid pressure level;
   disconnecting the impeller and turbine clutches from the cover;
   pressurizing the first pressure chamber to substantially the first fluid pressure level or to a second fluid pressure level greater than the first fluid pressure level;
   pressurizing the second pressure chamber to a third fluid pressure level greater than the first or second fluid pressure levels;
   passively draining the third pressure chamber to be substantially at the first fluid pressure level;
   connecting the impeller shell to the cover for a torque converter mode;
   pressurizing the first pressure chamber to a fourth fluid pressure level greater than the first fluid pressure level;
   pressurizing the second pressure chamber to a fifth fluid pressure level greater than the first fluid pressure level and less than the fourth fluid pressure level;
   pressurizing the third pressure chamber to substantially the first fluid pressure level;
   connecting the impeller shell to the cover; and,
   connecting the turbine shell to the impeller shell for a lockup mode.

2. The method of claim 1, wherein:
   pressurizing the first pressure chamber to substantially the first fluid pressure level or to a second fluid pressure level greater than the first fluid pressure level includes pressurizing the first pressure chamber to substantially the first fluid pressure level;
   connecting the impeller clutch to the cover for the torque converter mode includes enabling a first torque-carrying capacity for the impeller clutch;
   pressurizing the first pressure chamber to substantially the first fluid pressure level or to a second fluid pressure level greater than the first fluid pressure level includes pressurizing the first pressure chamber to the second fluid pressure level; and,
   connecting the impeller clutch to the cover for a torque converter mode includes enabling a second torque-carrying capacity, greater than the first torque-carrying capacity, for the impeller clutch.

3. The method of claim 1, wherein:
   pressurizing the second pressure chamber to a fifth fluid pressure level greater than the first fluid pressure level and less than the fourth fluid pressure level includes pressurizing the second pressure chamber to a sixth fluid pressure level;
   connecting the turbine shell to the cover for the lockup mode includes enabling a first torque-carrying capacity for the torque clutch;
   pressurizing the second pressure chamber to a fifth fluid pressure level greater than the first fluid pressure level and less than the fourth fluid pressure level includes pressurizing the second pressure chamber to a seventh fluid pressure level, greater than the sixth fluid pressure level; and,
   connecting the turbine clutch to the cover for the lockup mode includes enabling a second torque-carrying capacity, greater than the first torque-carrying capacity, for the torque converter clutch.

4. The method of claim 1, wherein pressurizing the first pressure chamber to substantially the first fluid pressure level or to a second fluid pressure level greater than the first fluid pressure level includes pressurizing the first pressure chamber to substantially the first fluid pressure level.

5. The method of claim 1, wherein pressurizing the first pressure chamber to substantially the first fluid pressure level or to a second fluid pressure level greater than the first fluid pressure level includes pressurizing the first pressure chamber to the second fluid pressure level.

6. The method of claim 1, wherein:
   pressurizing the first pressure chamber to substantially the first fluid pressure level or to a second fluid pressure level greater than the first fluid pressure level includes pressurizing the first pressure chamber to substantially the first fluid pressure level; and,
   pressurizing the second pressure chamber to a third fluid pressure level greater than the first or second pressure levels includes pressurizing the second pressure chamber to a third fluid pressure level greater than the first fluid pressure level and less than the second fluid pressure level.

7. The method of claim 1, wherein:
   pressurizing the first pressure chamber to substantially the first fluid pressure level or to a second fluid pressure level greater than the first fluid pressure level includes pressurizing the first pressure chamber to substantially the second fluid pressure level; and,
   pressurizing the second pressure chamber to a third fluid pressure level greater than the first or second pressure levels includes pressurizing the second pressure chamber to a third fluid pressure level greater than the second fluid pressure level.

8. The method of claim 1, wherein:
pressurizing the first pressure chamber to substantially the first fluid pressure level or to a second fluid pressure level greater than the first fluid pressure level includes maintaining substantially a same fluid pressure in the first pressure chamber or increasing fluid pressure in the first pressure chamber; and,
pressurizing the second pressure chamber to a third fluid pressure level greater than the first or second fluid pressure levels includes increasing fluid pressure in the second chamber, the method further comprising:
while passively draining the third pressure chamber to be substantially at the first fluid pressure level, maintaining substantially a same fluid pressure in the first pressure chamber.

9. The method of claim 1, wherein:
pressurizing the first pressure chamber to a fourth fluid pressure level greater than the first fluid pressure level includes increasing fluid pressure in the first pressure chamber; and,
pressurizing the second pressure chamber to a fifth fluid pressure level greater than the first fluid pressure level and less than the fourth fluid pressure level includes decreasing fluid pressure in the second pressure chamber, the method further comprising:
while passively draining the third pressure chamber to be substantially at the first fluid pressure level, maintaining substantially a same fluid pressure in the first pressure chamber.

10. The method of claim 1, wherein:
the torque converter includes a resilient element urging the impeller shell in a first axial direction, with a first force, to open the impeller clutch; and,
a second force, applied to the impeller shell in the first axial direction by pressure in the third pressure chamber is less than the first force.

11. The method of claim 10, further comprising:
exerting, with the third fluid pressure level, a third force on the impeller shell in a second axial direction, opposite the first axial direction, greater than the first force.

12. The method of claim 10, further comprising:
exerting, with the fourth fluid pressure level, a third force on the turbine shell in a second axial direction, opposite the first axial direction, greater than the first force.

13. A method of controlling a multi-function torque converter including a cover arranged to receive torque, an impeller including an impeller shell and at least one impeller blade connected to the impeller shell, a turbine including a turbine shell and at least one turbine blade connected to the turbine shell, a first pressure chamber at least partially formed by the turbine shell and the cover; a second pressure chamber at least partially formed by the impeller and turbine shells, and a third pressure chamber at least partially formed by the impeller shell and the cover, an impeller clutch including a portion of the impeller shell, and a turbine clutch including a portion of the turbine shell, the method comprising:
pressurizing the first pressure chamber to substantially a first fluid pressure level or to a second fluid pressure level greater than the first fluid pressure level;
pressurizing the second pressure chamber to a third fluid pressure level greater than the first and second fluid pressure levels;
passively draining the third pressure chamber to be substantially at the first fluid pressure level; and,
connecting the impeller shell to the cover for a torque converter mode.

14. The method of claim 13, further comprising:
pressurizing the first pressure chamber to a fourth fluid pressure level greater than the first fluid pressure level;
pressurizing the second pressure chamber to a fifth fluid pressure level greater than the first fluid pressure level and less than the fourth fluid pressure level;
passively draining the third pressure chamber to be substantially at the first fluid pressure level;
connecting the impeller shell to the cover; and,
connecting the turbine shell to the impeller shell for a lockup mode.

15. The method of claim 13, further comprising:
pressurizing the first and second pressure chambers to substantially the first fluid pressure level;
passively draining the third pressure chamber to be substantially at the first fluid pressure level; and,
disconnecting the impeller and turbine clutches from the cover.

16. The method of claim 13, wherein:
pressurizing the first pressure chamber to substantially the first fluid pressure level or to a second fluid pressure level greater than the first fluid pressure level includes pressurizing the first pressure chamber to substantially the first fluid pressure level;
connecting the impeller clutch to the cover for the torque converter mode includes enabling a first torque-carrying capacity for the impeller clutch;
pressurizing the first pressure chamber to substantially the first fluid pressure level or to a second fluid pressure level greater than the first fluid pressure level includes pressurizing the first pressure chamber to the second fluid pressure level; and,
connecting the impeller clutch to the cover for a torque converter mode includes enabling a second torque-carrying capacity, greater than the first torque-carrying capacity, for the impeller clutch.

17. The method of claim 13, further comprising:
pressurizing the second pressure chamber to a fifth fluid pressure level greater than the first fluid pressure level and less than the fourth fluid pressure level; and,
pressurizing the second pressure chamber to a sixth fluid pressure level, wherein:
connecting the turbine clutch to the cover for the lockup mode includes enabling a first torque-carrying capacity for the torque clutch;
pressurizing the second pressure chamber to a fifth fluid pressure level greater than the first fluid pressure level and less than the fourth fluid pressure level includes pressurizing the second pressure chamber to a seventh fluid pressure level, greater than the sixth fluid pressure level; and,
connecting the turbine clutch to the cover for the lockup mode includes enabling a second torque-carrying capacity, greater than the first torque-carrying capacity, for the torque converter clutch.

18. A method of controlling a multi-function torque converter including a cover arranged to receive torque, an impeller including an impeller shell and at least one impeller blade connected to the impeller shell, a turbine including a turbine shell and at least one turbine blade connected to the turbine shell, a first pressure chamber at least partially formed by the turbine shell and the cover; a second pressure chamber at least partially formed by the impeller and turbine shells, and a third pressure chamber at least partially formed by the impeller shell and the cover, an impeller clutch including a portion of the impeller shell and first friction material, and a turbine clutch including a portion of the turbine shell and second friction material, the method comprising:

maintaining a substantially constant first fluid pressure force, in a first axial direction, on the impeller shell;

applying a second fluid pressure force on respective first sides of the turbine and impeller shells in the first axial direction and in a second axial direction opposite the first axial direction, respectively;

applying a third fluid pressure force to a second side of the turbine;

displacing the impeller shell in the second axial direction;

bringing the first friction material into contact with the cover and the portion of the impeller shell; and, independently rotating the turbine shell with respect to the impeller shell.

19. The method of claim 18, further comprising:

increasing the third fluid pressure force;

setting the second fluid force less than the increased third fluid pressure force;

displacing the turbine shell in the first axial direction; and, bringing the second friction material into contact with the respective portions of the turbine and impeller shells.

20. The method of claim 18, further comprising:

equalizing the first, second, and third fluid pressure forces;

independently rotating the impeller shell with respect to the cover; and, independently rotating the turbine shell with respect to the impeller shell.

\* \* \* \* \*